Oct. 28, 1952  J. W. JEWELL  2,615,785
METHOD FOR RECOVERY OF POWDERED CATALYST
Filed March 23, 1950
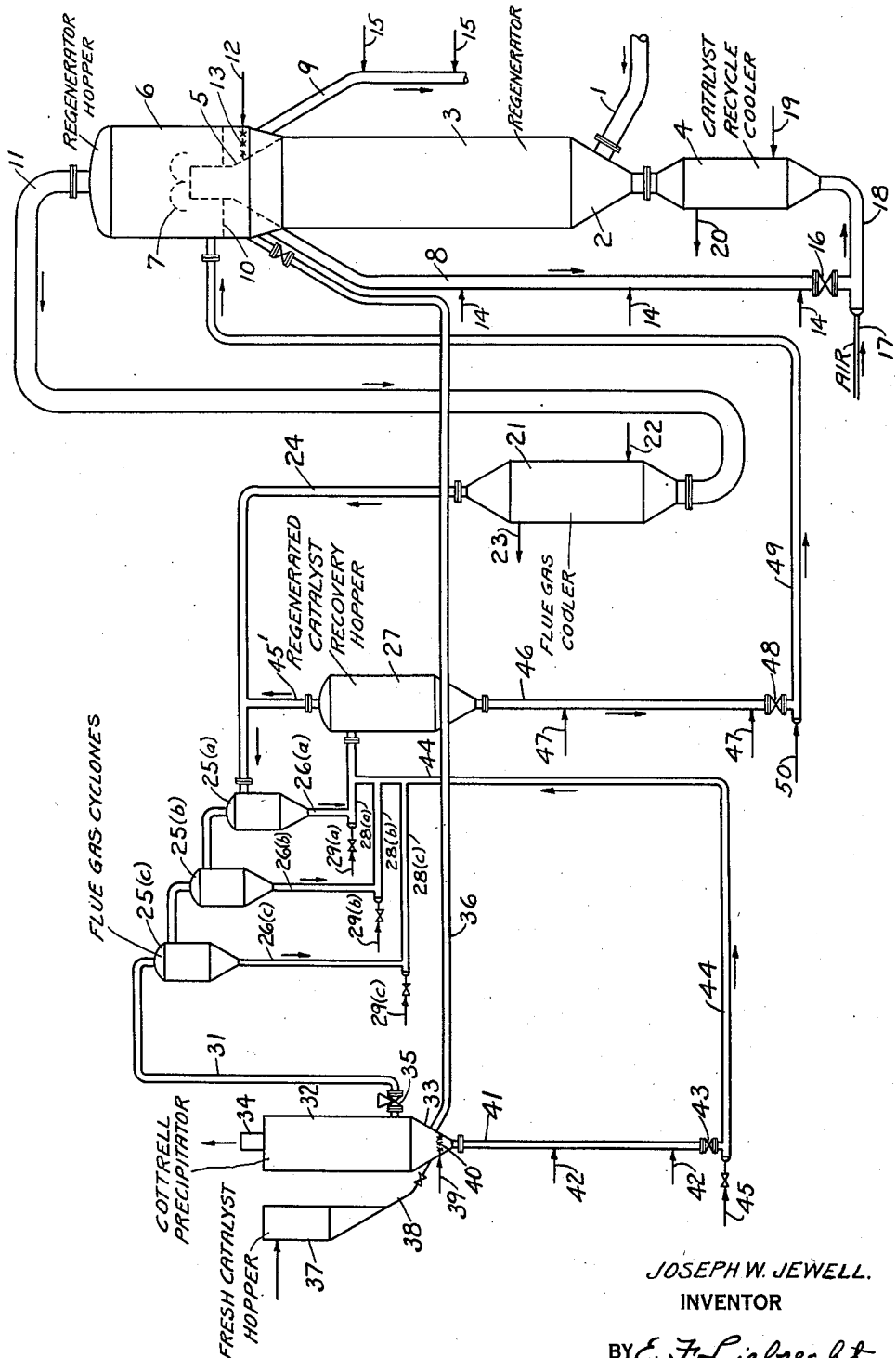
JOSEPH W. JEWELL,
INVENTOR
BY E. F. Liebrecht
Edmond F. Shanahan
ATTORNEYS Patented Oct. 28, 1952

2,615,785

UNITED STATES PATENT OFFICE 2,615,785

METHOD FOR RECOVERY OF POWDERED CATALYST

Joseph W. Jewell, Summit, N. J., assignor to The M. W. Kellogg Company, Jersey City, N. J., a corporation of Delaware Application March 23, 1950, Serial No. 151,401

5 Claims. (Cl. 23—1)

The present invention relates to an improved method and apparatus for the recovery of finely divided or powdered solids from gaseous suspensions thereof. More particularly, the invention pertains to the recovery of finely divided contact or catalytic material from gaseous or vaporous suspensions thereof produced during various conversion operations, as for example the catalytic cracking of high boiling hydrocarbons to low boiling hydrocarbons within the gasoline boiling range. In a catalytic conversion system of the fluidized pseudo-liquid catalyst mass type, catalyst entrained in hot regenerating gases rising from the mass of catalyst undergoing regeneration in a regeneration chamber may be recovered for return to the regeneration zone by first settling out relatively coarse hot catalyst; and then cooling the gases with residual catalyst and passing them through a separating means for precipitating fines, the cooling being necessary in order to protect the fines-separating means from high temperatures. The invention involves mixing some of the hot coarse catalyst separated directly above the regenerator to heat and make flowable the subsequently separated relatively fine and relatively cool catalyst.

This application is a continuation-in-part of application Serial No. 386,134, filed March 31, 1941, issued as U. S. Patent No. 2,515,371 on July 18, 1950, and entitled "Method for Recovery of Powdered Catalyst in Conversion Operation on Gases or Vapors."

It has been proposed to effect the conversion of hydrocarbons by a continuous cyclic operation wherein a finely divided catalytic material is mixed with a stream of the vapors of the hydrocarbons undergoing treatment, and the mixture passed continuously through a conversion zone maintained under suitable conditions to effect the desired conversion. The spent catalytic material is separated from the vaporous conversion products and regenerated for reuse in the conversion operation by combustion of the deactivating deposits such as carbonaceous material formed thereon during the conversion operation. Regeneration is effected by mixing the spent catalytic material with an oxygen-containing gas and passing the mixture through a regeneration zone maintained under suitable conditions to effect the desired combustion without subjecting the catalyst to excessive temperatures which would unduly impair its catalytic activity. The regenerated catalytic material is then recovered from the combustion gases by suitable separating means, and returned to the conversion system. Since a conversion operation of this type involves the circulation of a very substantial quantity of catalyst in proportion to the charging stock in both the conversion and regeneration stages, its economic feasibility is largely dependent upon the efficiency with which the catalytic material is recovered from the gaseous or vaporous suspensions.

It has been proposed to effect this recovery by passing the gaseous suspension of finely divided catalytic material successively through a plurality of series of separating zones, each of which operates to separate part of the suspended material. Incident to such procedures, the relatively fine material is separated in the last separating zone. With such recovery systems, it is also considered desirable that the suspension be supplied to the series of separating zones at a pressure sufficiently high to pass through all of the zones without any recompression by means of fans or blowers between the zones because of the undesirable attrition on the suspended solids resulting from the passing of them through compression fans or blowers and the investment cost incident to the use of such compression devices.

Several serious problems arise in connection with recovery systems of the above described type. One of these problems results from the classification of the particles into relatively fine and relatively coarse fractions incident to their passage through the several separating zones. Since under normal operations it is preferable to maintain particle size distribution of the catalytic material substantially constant during the operation, it is desirable that these various size classifications be combined and returned to the conversion system in such manner as to maintain the particle size distribution of the catalyst as circulated through the conversion zone substantially constant. A further problem arises with respect to the difficulty of transporting the extremely fine fraction since it has been ascertained that these particles are not readily flowable and normally must be conveyed against a back pressure higher than that maintained in the zone in which they are separated.

The primary object of the present invention is the provision of a method and apparatus for the recovery of finely divided catalyst from gaseous suspension wherein these problems and difficulties are obviated.

One of the features of the present invention whereby the difficulties arising out of the segregation of the extremely fine catalytic particles and their lack of free flowing characteristics is eliminated, involves mixing therewith relatively coarse particles preferably derived from a previous stage of the recovery operation. Various other specific features and advantages of the invention will be apparent from the following detailed description of its practice given in connection with the appended drawing.

The drawing illustrates an embodiment of the invention as applied to the regeneration of a powdered or finely divided spent cracking catalyst such as an activated clay of the "Super-Filtrol" type and shows a suitable arrangement of the apparatus and process flow for this purpose.

Certain features of the process flow and apparatus have been previously disclosed in my copending applications Serial No. 348,605, filed July 30, 1940, now U. S. Patent 2,304,827, and Serial No. 394,440, filed July 21, 1941, now U. S. Patent 2,439,811.

The used or spent catalyst to be regenerated by combustion of the carbonaceous deposit thereon enters the system from the conversion system through line 1 carried in a suitable conveying gas such as air or steam, or a mixture thereof, and is introduced into the bottom cone 2 of the regenerator 3. Normally, the used catalyst thus introduced is at an elevated temperature approximating the temperature utilized in the conversion zone. In cone 2 the stream of hot spent catalyst introduced through line 1 meets and mixes with a stream of relatively cool recycled regenerated catalyst and air from heat exchanger or cooler 4 and passes therewith upwardly through the regenerator chamber 3. Operating conditions in the regeneration chamber preferably are maintained so as to maintain a relatively large concentration of catalyst and low vapor velocities in the regeneration zone. During the course of the travel of the spent catalyst upwardly through the regeneration chamber, combustion of the carbonaceous deposit is effected to required extent at an elevated temperature maintained below the safe maximum regeneration temperature.

Gaseous regeneration products (flue gas) and regenerated catalyst exit from the upper part of the regenerator through a constricted outlet 5, the vapor velocity through the outlet 5 being relatively great compared to that maintained in the regenerator. From outlet 5 the gaseous mixture exits into a separating hopper 6 of relatively large cross-sectional area such that the velocity of the gases therein is preferably of about the same magnitude or smaller than the gas velocity in regenerator 3. A baffle 7 is preferably interposed directly in the path of the vapor mixture exiting from outlet 5 whereby it is directed laterally and downwardly thus functioning to propel catalyst particles present in the mixture out of the path of the vapor flow into a quiescent collecting zone defined by the outer walls of the outlet 5 and the lower inner walls of the settling or collecting hopper 6. Catalyst thus separated is withdrawn through lines 8 and 9 opening into the lower part of the collecting zone. A quantity of catalyst is preferably left at all times in said zone to maintain a level of catalyst therein at a substantial distance above said outlet opening as indicated by dotted line 10.

A suitable aerating and stripping medium such as steam is introduced through a line 12 terminating in suitable fluid distributing means 13, in the bottom of the mass of catalyst in the collecting zone to displace and strip regeneration gas entrained therewith and to maintain the mass in an aerated flowable condition. Any suitable number of lines 12 and 13 may be employed and be so distributed as to assure the required stripping and aerating effects. The stripping medium and stripped gases pass out of hopper 6 overhead through line 11.

Outlet lines for regenerated catalyst 8 and 9 preferably are provided with means at suitable intervals along their length for the introduction of an aerating medium such as steam or air into the interior thereof, these means being lines 14 leading to line 8 and lines 15 leading to line 9. An aerating medium is introduced into these lines in amount sufficient to impart the characteristics of a pseudo-liquid, i. e. flowability and relatively high density, to the catalyst flowing therethrough whereby the head of catalyst maintained in the outlet standpipe lines 8 and 9 will suffice to overcome the pressure differential existing between the point of entry and the point of discharge of the regenerated catalyst to and from these lines. Accordingly, these standpipe lines 8 and 9 operate pursuant to the procedure disclosed and claimed in said said U. S. Patent 2,304,827. Regenerated catalyst passing through line 9 is discharged to the conversion system. Regenerated catalyst is diverted and recycled through line 8 in amounts regulated by suitable valve means such as a slide valve 16 to provide the required temperature control in regenerator 3. From valve 16 the recycled catalyst is fed into a stream of air or other oxygen-containing gas supplied through line 17 and the mixture of gas and recycled catalyst pass through inlet line 18 to a heat exchanger or cooler 4, through which a suitable heat exchange medium is circulated by lines 19 and 20 and wherein the regenerated catalyst before passing to the inlet cone 2 is cooled to a suitable temperature to provide the required temperature control in regenerator 3.

Gaseous regeneration products mixed with a relatively small portion of the catalyst originally present therein are withdrawn from the upper part of hopper 6 through line 11 and pass to a series of separating zones constituted by suitable gas-solids separators such as cyclones, Cottrell precipitators, filters, or the like.

The gaseous suspension in outlet pipe 11 consists essentially of flue gas and residual suspended regenerated catalyst including both relatively fine and relatively coarse particles. This suspension is preferably supplied to the recovery system at a superatmospheric pressure sufficiently high to impel it completely therethrough and into the atmosphere from the final separating zone, the pressure in the successive separating zones being progressively lower in the direction of the flow of the suspension by reason of the pressure drop in the interconnecting lines and gas-solids separating means. Incidental to such separation it has been ascertained that classification and segregation of the particles occur, particularly segregation of the extremely fine particles, in the final separating zone, that is in the Cottrell precipitator as shown, or any other suitable means utilized for the separation of the last increment of the suspended particles.

In certain instances cooling of the suspension passing through line 11 may be desirable, as for example by passing it through a suitable cooler or heat exchanger 21 through which a heat exchange medium is circulated through lines 22 and 23, thereby effecting a reduction in temperature and volume of the suspension passing therethrough, it being understood however that such cooling is not essential and may be omitted.

From cooler 21 the gaseous suspension passes by line 24 to a suitable gas-solids separator, or preferably a series of such separators such as cyclone separators or the like, 25(a), 25(b), and 25(c). In each of these a part of the suspended particles consisting of relatively large or coarse particles compared to the particles separated in the final separating zone, is separated and withdrawn from the bottom of the separators through tail pipes 26(a), 26(b), and 26(c). Material discharged from these tail pipes may be conveyed to a regenerated catalyst recovery hopper 27 through lines 28(a), 28(b), and 28(c) by way of transfer line 44 by means of a suitable fluid conveying medium such as steam, supplied by jets through lines 29(a), 29(b) and 29(c).

From separator 25(c) the suspension passes by line 31 to a Cottrell precipitator 32 or other suitable means for separting the extremely fine particles from the gaseous suspension, the separated particles being collected in the bottom cone or hopper 33 or the precipitator, and the separated gas exiting overhead to the atmosphere through line 34.

The Cottrell precipitator 32 is preferably operated under approximately atmospheric pressure, and a pressure reduction valve 35 is provided in line 31 for regulating the pressure so that the desired pressure may be maintained in separator 32 irrespective of the pressure in the discharge line leading from cyclone 25(c).

A continuous stream of previously separated relatively coarse particles is supplied to a mixing zone in cone 33 in the bottom of precipitator 32 through line 36 from hopper 6 for the purpose of adding coarser material to the fines recovered in the precipitator so that the mixture is readily "aeratable" and "flowable" in dense phase standpipe. The hot coarse material from the dense mass whose upper surface is indicated by dotted line 10 in hopper 6 is flowed in a stream directly to the hopper 33 without intervening cooling treatment. Coarse particles supplied through line 36 may be supplemented or in some instances replaced by fresh or make-up catalyst supplied from hopper 37 through line 38. An aerating medium is supplied to the bottom of the hopper 33 through line 39 terminating in a distributor 40 for aerating the mixture therein and maintaining it in a readily flowable condition.

From hopper 33 the aerated mixture flows into an outlet standpipe 41, operating on a principle similar to standpipe 8, an aerating fluid such as steam being supplied thereto along its length through lines 42 to maintain the solid particles flowing therein in a pseudo-liquid condition. Standpipe 41 is preferably of a height sufficient to provide a fluid head sufficient to largely or entirely equalize the pressure differential between the hopper 32 and the zone of relatively high pressure to which the separated fines are suitably recycled back into the system, for example hopper 27 or hopper 6. From standpipe 41, the mixture is discharged by means of a suitable valve such as slide valve 43 into transfer line 44. Steam or other suitable conveying medium is supplied by line 45 to line 44 to convey the mixture to hopper 27 or if desired to any other zone containing previously separated coarse particles. The conveying gas passing through line 45 to hopper 27 obviously must flow against a back pressure corresponding to the pressure maintained in hopper 27 and accordingly the pressure of the gas supplied through line 45 is sufficient to overcome this back pressure and the pressure drop in line 44.

In passing through line 44 the mixture is combined with the streams from lines 28(a), 28(b) and 28(c) and passes to collecting hopper 27 wherein the combined fractions are separated and the gaseous suspending medium is separated overhead through line 45′ into line 24. From hopper 27 the separated solids are withdrawn through a standpipe 46 operating on a principle similar to standpipes 8 and 41 and to which a suitable aerating medium is supplied through lines 47. Standpipe 46 is preferably of a height sufficient to largely or entirely equalize the difference in pressure between hopper 27 and hopper 6. From standpipe 46 the solids are fed through a suitable valve 48 into transfer line 49 wherein they are suspended by suitable conveying fluid supplied through line 50 and conveyed therethrough to hopper 6 and combined with the initially separated material.

The practice of the invention may be further exemplified by reference to conditions obtained in a specific example. Pursuant to this example, a regenerated powdered cracking catalyst was separated in the various separating zones based upon the quantity of material entering the system through line 1 approximately as follows:

| | Per cent |
|---|---|
| Hopper 6 | 75 |
| Cyclone 25(a) | 20 |
| Cyclone 25(b) | 2.5 |
| Cyclone 25(c) | 1 |
| Precipitator 32 | 1.5 |

In this example, pressure conditions obtaining throughout the system were approximately as follows:

| Zone: | Pressure, lbs./sq. in. |
|---|---|
| Regenerator 3 (near the bottom) | 16 |
| Hopper 6 | 8 |
| Line 24 | 3 |
| Cyclone 25(a) (inlet) | 2.3 |
| Cyclone 25(b) (inlet) | 1.8 |
| Cyclone 25(c) (inlet) | 1.3 |
| Precipitator 32 (inlet) | 0.4 |
| Valve 43 | 5 |
| Hopper 27 | 3.5 |
| Valve 48 | 9.5 |

In this particular example, the powdered catalyst undergoing treatment was a cracking catalyst consisting of an activated clay of the "Super-Filtrol" type and the fines collected in hopper 33 were mixed with relatively coarse particles introduced through line 36 in about equal proportions. Obviously in certain instances the addition of more or less coarse particles may be necessary for best results. It is to be noted in the above example the pressure maintained at valve 43 at the bottom of standpipe 41 is 5 pounds whereas the pressure in hopper 27 is 3.5 pounds. Due to this pressure differential the catalyst may be introduced at a controlled rate regulated by valve 43 into the conveying fluid passing through line 44 to hopper 27.

While the embodiment of the invention described above is regarded as a preferred mode for its practice, it will be apparent to those skilled in the art that various changes and modifications may be made therein and various subcombinations of the described method and apparatus may be employed without departing from the essential features of the invention, and such modifications are intended to be included within the scope of the appended claims. For example, the cyclone 25(a), 25(b) and 25(c) may be mounted within hopper 6 with their tail pipes, 26(a), 26(b) and 26(c) discharging into the dense phase mass therein (dotted line 10). The fines containing gases withdrawn overhead would then be cooled in cooler 21 and solid fines would be separated in Cottrell precipitator 22, separated fines being returned directly to hopper 6 via line 44. The important point is not whether all or most of the cyclone separating is done before or after flue gas cooler 21 or within or without hopper 6, but that the final separation of the finest particles takes place after cooler 21, and the fines separated in this final stage of separation need to be diluted with particles which are coarse (so as to make them flowable) and which are hot (so that collected vapors will not condense and make the fines into a sort of mud); coarse, hot fines are conveniently provided from hopper 6 located directly above the regenerator where all particles are hot and coarsest particles are separated. It is to be understood that the claims which recite removing catalyst and residual fines from the enlarged settling chamber and then cooling them and then separating particles of extreme fineness, are intended to include processes which have the additional steps of one or more stages of cyclone or other separation or catalyst of increasing coarseness either before or after the cooling step.

I claim:

1. In a catalytic conversion system of the type wherein a gas is passed upwardly through a contacting zone and is contacted in said zone with a mass of catalyst in a dense turbulent suspended phase, an improved process for withdrawing effluent gases from said contacting zone and recovering entrained catalyst from said withdrawn gases, which method includes the steps of: withdrawing effluent gases and suspended solids substantially vertically upward through a restricted opening above said dense contacting phase and discharging said upflowing suspension into an enlarged settling zone located in superimposed position above said contacting zone to reduce the upward velocity of said suspension and to precipitate relatively coarse catalyst into a settled dense phase in the lower portion of said enlarged settling zone; withdrawing gases and residual fines from said settling zone and cooling them; passing the cooled gases and residual fines through a separating zone for separating relatively fine catalyst; and mixing coarse catalyst with said separated fines near the point of separation of said fines to form a readily fluidizable mixture and to reheat said relatively fine catalyst prior to flowing it from said point of separation back into said conversion system.

2. In a catalytic conversion system of the type wherein a gas is passed upwardly through a contacting zone and is contacted in said zone with a mass of catalyst in a dense turbulent suspended phase, an improved process for withdrawing effluent gas from said contacting zone and recovering entrained catalyst from said withdrawn gas, which method includes the steps of: flowing effluent gases and suspended solids from said dense contacting phase into an enlarged settling zone superimposed above said phase, in a substantially vertical upflowing stream through a restricted opening between said contacting zone and said enlarged settling zone; collecting coarse settled catalyst in a dense particle-recovery phase in said enlarged settling zone below said restricted opening and out of the stream of flow of said effluent gases entering said settling zone through said restricted opening; withdrawing effluent gases containing residual fines from the upper part of said settling zone; cooling said withdrawn effluent and residual fines; separating relatively cool residual fines from said effluent; flowing a stream of relatively hot coarse catalyst from said dense particle-recovery phase to the point of separation of residual fines; mixing said coarse hot catalyst with said residual fines to form a mixture of improved flow characteristics and higher temperature; and flowing said mixture into said enlarged settling zone.

3. In a catalytic conversion system of the type wherein a gas is passed upwardly through a contacting zone and is contacted in said zone with a mass of catalyst in a dense turbulent suspended phase, an improved process for withdrawing effluent gas from said contacting zone and recovering entrained catalyst from said withdrawn gas, which method includes the steps of: withdrawing effluent gases and suspended solids substantially vertically upward through a restricted opening above said dense contacting phase and discharging said upflowing suspension into an enlarged settling zone located in superimposed position above said contacting zone to reduce the upward velocity of said suspension and to precipitate relatively coarse catalyst in said settling zone; collecting said precipitated coarse catalyst in a dense particle-recovery phase out of the stream of flow of said effluent gases and in a region of said settling zone lower than the point which said withdrawn effluent gases enter said settling zone; withdrawing said effluent gases containing residual fines from the upper part of said settling zone and passing said effluent through at least one stage of separation to recover relatively finer particles, and a final stage separation by electrical precipitation; cooling the effluent together with residual particles subsequent to withdrawal from said settling zone but prior to said electrical precipitation; flowing a stream of relatively hot and coarse catalyst from said dense particle-recovery phase to said electrical precipitating means; and mixing said coarse catalyst with said electrical separated fines near the point of separation of said fines to form a readily fluidizable mixture and to reheat said relatively fine catalyst sufficiently to maintain a temperature in the bottom of said precipitating means such that condensation does not occur.

4. In a catalytic conversion system of the type wherein a gas is passed upwardly through a contacting zone and is contacted in said zone with a mass of catalyst in a dense turbulent suspended phase, an improved process for withdrawing effluent gas from said contacting zone and recovering entrained catalyst from said withdrawn gas, which method includes the steps of: withdrawing effluent gases and suspended solids substantially vertically upward through a restricted opening above said dense contacting phase and discharging said upflowing suspension into an enlarged settling zone located in superimposed position above said contacting zone to reduce the upward velocity of said suspension and to precipitate relatively coarse catalyst in said settling zone; collecting said precipitated coarse catalyst in a dense particle-recovery phase out of the stream of flow of said effluent gases and in a region of said settling zone lower than the point which said withdrawn effluent gases enter said settling zone; withdrawing said effluent gases containing residual fines from the upper part of said settling zone; passing the effluent together with fines remaining suspended therein successively through a plurality of separating zones for separating catalyst of increasing fineness, the catalyst from the last of said zones being of extreme fineness; cooling said gas and residual fine at some point after said gases leave said settling chamber but prior to their introduction into the last of said zones; flowing a stream of relatively hot coarse catalyst from said dense particle-recovery phase to the point of separation of said catalyst of extreme fineness without intervening cooling; mixing said coarse hot catalyst with said catalyst of extreme fineness to form a mixture of improved flow characteristics and higher temperature; and flowing said mixture back into said conversion system.

5. In a catalytic conversion system of the type wherein a gas is passed upwardly through a contacting zone and is contacted in said zone with a mass of catalyst in a dense turbulent suspended phase, an improved process for withdrawing effluent gas from said contacting zone and recovering entrained catalyst from said withdrawn gas, which method includes the steps of: withdrawing effluent gases and suspended solids substantially vertically upward through a restricted opening above said dense contacting phase and discharging said upflowing suspension into an enlarged settling zone located in superimposed position above said contacting zone to reduce the upward velocity of said suspension and to precipitate relatively coarse catalyst in said settling zone; collecting said precipitated coarse catalyst in a dense particle-recovery phase out of the stream of flow of said effluent gases and in a region of said settling zone lower than the point which said withdrawn effluent gases enter said settling zone; withdrawing said effluent gases containing residual fines from the upper part of said settling zone; passing said effluent gases together with residual fines through a cooling means; passing the cooled gases and residual fines through a separating zone for separating relatively fine catalyst into a collecting means; and flowing a stream of relatively coarse hot catalyst directly from said dense phase mass of recovered catalyst to said fines-collecting means without intervening cooling treatment and mixing it with said fines to improve the flow characteristics and to reheat said relatively fine catalyst prior to reintroducing said catalyst into said conversion system.

JOSEPH W. JEWELL.

REFERENCES CITED

The following references are of record in the file of this patent:

UNITED STATES PATENTS

| Number | Name | Date |
|---|---|---|
| 2,410,284 | Gunness et al. | Oct. 29, 1946 |
| 2,451,803 | Campbell et al. | Oct. 19, 1948 |
| 2,515,371 | Jewell | July 18, 1950 |
| 2,526,486 | Krebs | Oct. 17, 1950 |

FOREIGN PATENTS

| Number | Country | Date |
|---|---|---|
| 361,837 | Great Britain | Nov. 21, 1931 |